(12) United States Patent
Elberbaum (10) Patent No.: US 6,357,936 B1
(45) Date of Patent: Mar. 19, 2002

(54) HOLDER FOR A BALL-SHAPED TELEVISION CAMERA OR A TV CAMERA CASE

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 0 days.

(21) Appl. No.: 09/472,342

(22) Filed: Dec. 27, 1999

(51) Int. Cl.7 .................. G03B 117/00; B56D 85/38; H04N 5/225
(52) U.S. Cl. ................ 396/427; 206/316.2; 348/373
(58) Field of Search ................. 396/419, 427, 396/428; 348/373, 143; 206/316.2

(56) References Cited

U.S. PATENT DOCUMENTS

| 4,736,218 A | * | 4/1988 | Kutman | 396/427 |
| 4,855,823 A | | 8/1989 | Struhs | 358/108 |
| 4,984,089 A | * | 1/1991 | Stiepel et al. | 396/427 |

FOREIGN PATENT DOCUMENTS

| GB | 0 537 468 A | 4/1993 |
| GB | 0 642 053 A | 3/1995 |

OTHER PUBLICATIONS

U.S. application 09/431,459, filed on Nov. 1, 1999, with David Elberbaum as Inventor, entitled "Ball Shaped Camera Housing with Simplified Positioning".

* cited by examiner

*Primary Examiner*—Christopher E. Mahoney
(74) *Attorney, Agent, or Firm*—Rosenman & Colin LLP (57) ABSTRACT

A holder for a ball-shaped camera case for holding the camera case containing a TV camera to a fixed mounting structure such as a wall, ceiling and the like includes a ring-shaped holder having an outer thread and an inner curved rim with a curvature radius of the camera case. The holder further includes an elongated cover having a flanged rim at one end and a portion of hemispherical shape at another end. An elongated cutout wider than a pane of a lens of the camera is made in the elongated cover for providing an optical path for the lens and gripping the camera case inside that portion of hemispherical shape. A locking nut is tightened onto the outer thread of the elongated cylindrical cover. The locking nut has an inner shoulder for locking the cover to the ring-shaped holder. The cylindrical cover can be rotated for positioning the cutout around the axis of the hemispherical portion within the length of the cutout and the optical path is not obstructed.

44 Claims, 11 Drawing Sheets

HOLDER FOR A BALL-SHAPED TELEVISION CAMERA OR A TV CAMERA CASE

BACKGROUND OF THE INVENTION

1. Field of the Invention

This invention relates to a television camera apparatus used for surveillance applications.

2. Decsription of the Prior Art

Surveillance television cameras are commonly mounted onto a wall, pole, ceiling or any other fixed base by using an extended arm, known as a camera mount. The extended arm or the camera mount includes a swivel joint, which permits the positioning of the horizontal and vertical axes of the camera in order to direct the camera lens toward its intended observation end. In many instances the television cameras are covered by a housing or case which is bulky and, as a result, the entire camera assembly becomes large and heavy and this is very disturbing to the architecture of buildings and interiors where the TV camera is placed.

There are other types of ball-shaped housings or cases for cameras for use in a vandal or explosion prone environment such as the surveillance of oil fields, refineries and/or similar explosive gaseous environment. Applicant's U.S. patent application for Ball-Shaped camera housing with simplified positioning was filed on Nov. 1, 1999 (Ser. No. 09/431,459). That application disclosed the housing suitable for such environment. Such ball-shaped housing or case can be mounted tightly between two holders having a cutout with a curvature diameter equivalent to the diameter of the ball-shaped case. Such a ball-shaped camera or a case can be repositioned or directed toward a different scene in front of the holder by releasing the front holder gripping pressure. However, the positioning of such a ball-shaped camera is limited to an angle within a sector in front of the front holder and the limitation depend on how wide is the angle of view of the lens. For a lens with a very wide angle of view, the positioning may be limited to a very narrow angle because the visual path of the lens can be obstructed by the front holder surface, even by a small repositioning of the camera.

SUMMARY OF THE INVENTION

It is an object of the present invention to provide a holder for a television camera having a ball-shape that permits a wider repositioning of its horizontal and vertical axes for observing different scenes.

It is a further object of the present invention to provide pendant holders for a television camera having a ball-shape that can be mounted to a ceiling or a wall and to maintain its simple repositioning capabilities.

Another object of the present invention is to provide a holder for a television camera having a ball-shape that is pleasing in its design and which does not obstructs the interior designs of a building.

These and other objects of the present invention are attained by a holder for a ball-shaped camera case having a truncated rear portion for providing a spacing and an outlet for an electrical cable; a ring-shaped holder including a fastening means for example an outer thread and an inner curved rim having a curvature radius to a radius of the ball-shaped camera case for supporting and locking said ball, and means for attaching said ring-shaped holder to a fixed mounting fixture and for providing a passage for said cable to the fixed mounting fixture through said ring-shaped holder; an elongated cylindrical cover having a flanged rim at one end thereof and a portion of hemispherical shape at another end thereof and further having an elongated cutout having a width slightly wider than a pane of a lens of said camera and extending from a center of said hemispherical shape toward said flanged rim for providing an optical path for the lens of said camera and for gripping said ball-shaped. camera case inside a hemispherical portion of said hemispherical shape and for providing said camera with a positioning capacity extending through a length of said cutout; and a locking nut having a fastening means, for example a thread complementary to said outer thread and an inner shoulder for attaching and locking said elongated cylindrical cover to said ring-shaped holder by engaging said flanged rim with said inner shoulder and tightening said nut onto said outer thread and locking said ball-shaped camera case between said inner curved rim and said hemispherical portion, wherein said cylindrical cover can be rotated for positioning said cutout around the axis of said hemispheric shape and the lens of said camera can be adjusted to any position within the length of said cutout, and wherein said optical path is not obstructed.

BRIEF DESCRIPTION OF THE DRAWINGS

The foregoing and other objects and features of the present invention will become apparent from the following description of preferred embodiments of the invention with reference to the accompanying drawings, in which.

DETAILED DESCRIPTION OF THE PREFERRED EMBODIMENTS

Figure 1A:
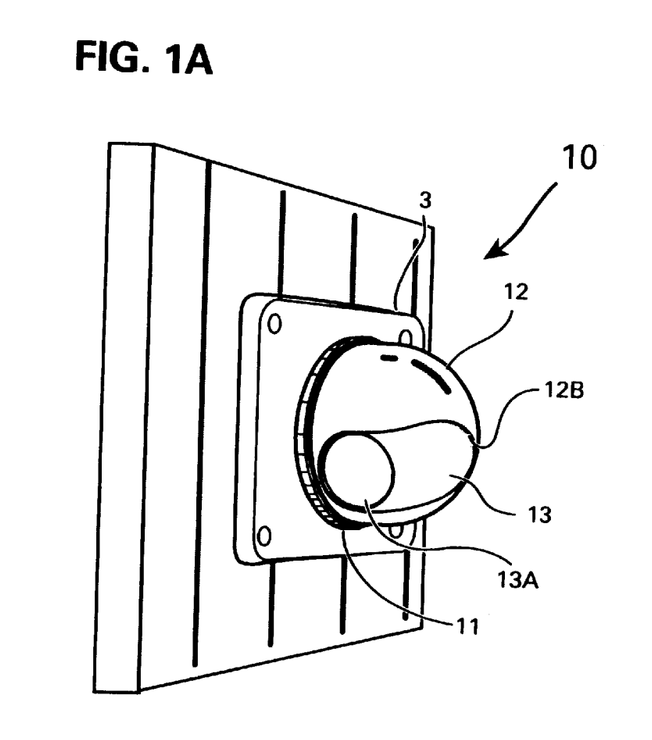
FIG. 1A is a perspective view of a TV camera holder of the present invention mounted to a wall.
Figures 2A, 2B, 2C:
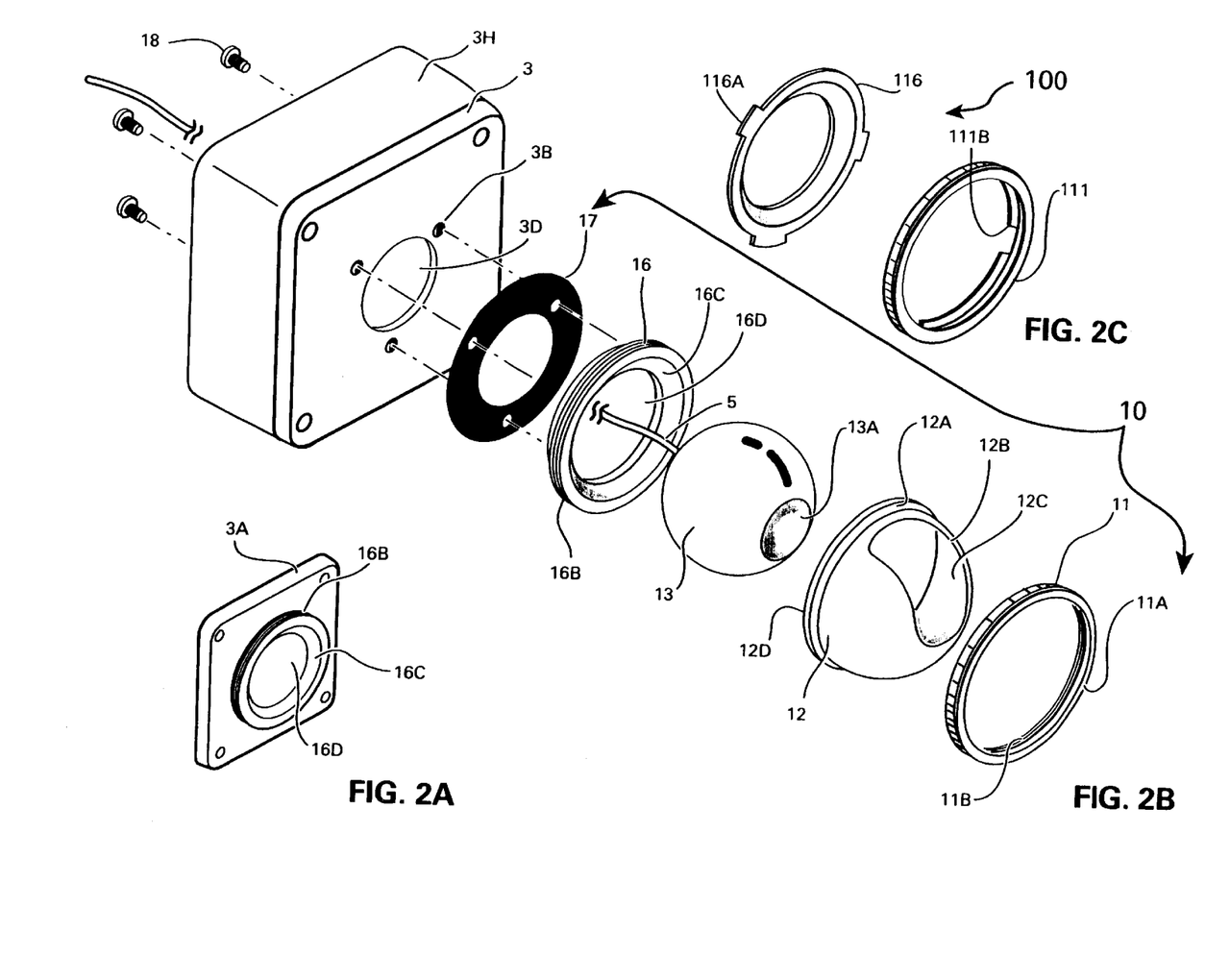
FIG. 2A is an exploded perspective view of the TV camera holder of the invention.
FIGS. 2B and 2C are perspective and exploded views of television camera holder of FIG. 2A with ring-shaped holders of different shapes.

A camera holder 10 for mounting a ball-shaped camera onto a wall AS shown in FIG. 1A comprises a ring shaped holder 16 shown in FIG.2B. Holder 10 is attached to a wall mounted cover 3 to support a ball-shaped camera 13. The holder 10 further includes a locking nut 11 and a locking cover 12.

Figure 1B:
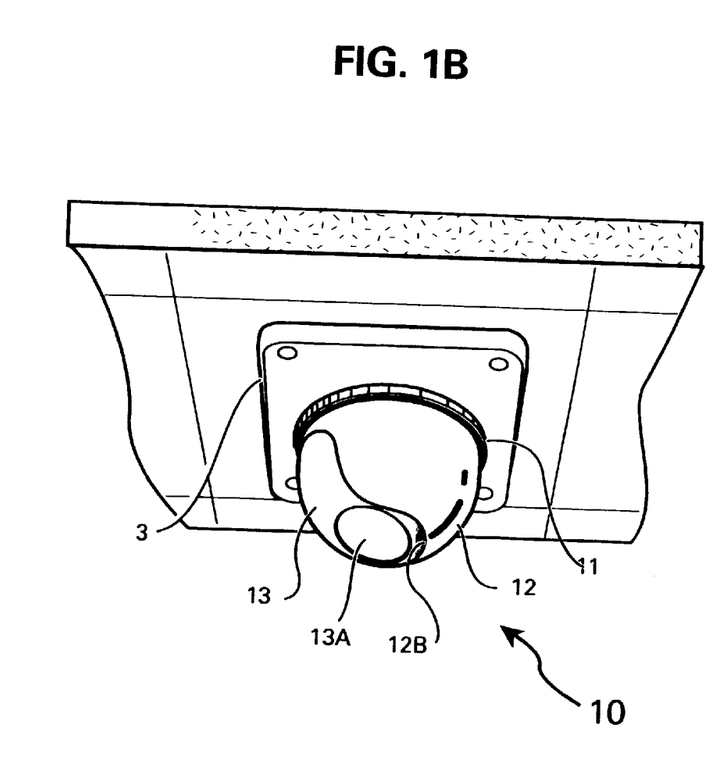
FIG. 1B is a perspective view of the holder for the television camera of the invention mounted to a ceiling.

A camera holder 10 for mounting a ball-shaped camera 13 to a ceiling shown in FIG. 1B is identical to the camera holder 10 of FIG. 1A for mounting a ball-shaped camera onto a wall with the exception of the lens pane 13A which is shown facing downwards through a cutout 12B, while the lens pane 13A shown in FIG. 1A faces sideways through the cutout 12B. The camera holder 10 is supported by the ring-shaped holder or ring 16 shown in FIG. 2B or the ring-shaped holder 116 shown in FIG. 2C which can be a ring attached to cover 3 of an electrical box 3H or it can be an integral part, molded or otherwise, of a cover 3A of an electrical box shown in FIG. 2A.

Figures 4A, 4B:
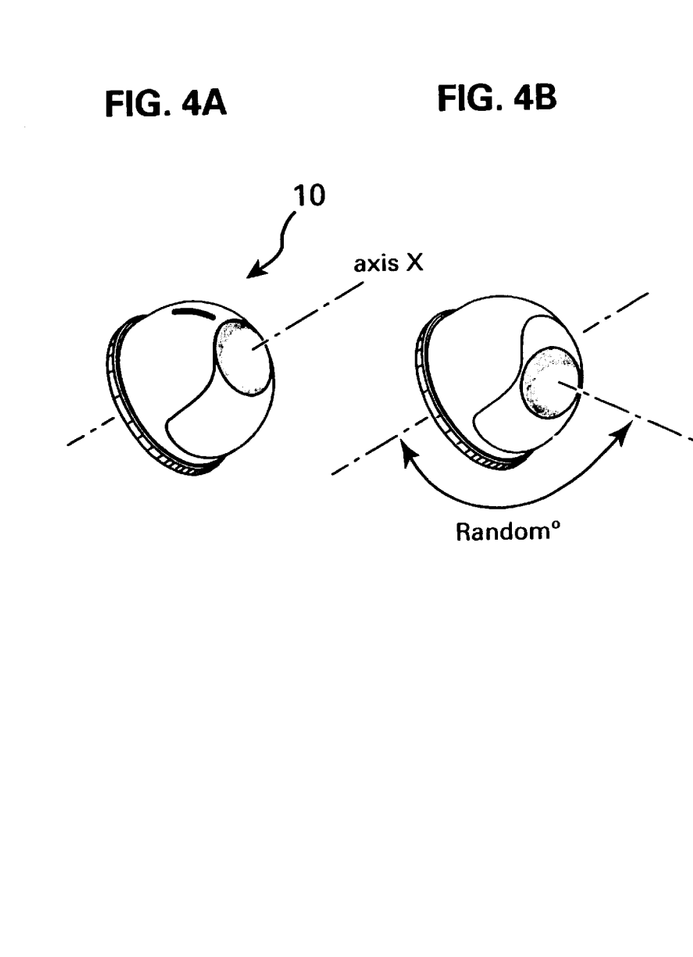
FIGS. 4A, 4B, 4C and 4D are perspective views of the television camera at different positionings.
Figures 4C, 4D:
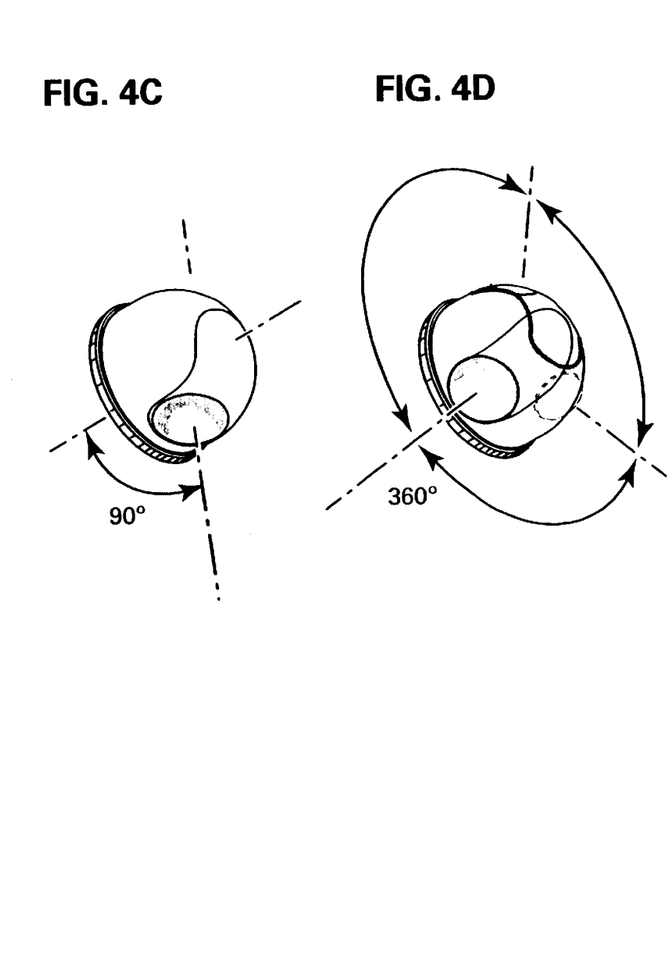

The camera holder 10 of FIGS. 2A and 2B comprises a ring-shaped holder or ring 16, which is attached to the cover 3 of the electrical box 3H using a seal 17 and screws 18 or any other suitable fasteners. An opening 3D in the cover 3 of the electrical box 3Il provides a passage for a connecting cable 5 or wires and the holes 3B are provided for the screws 18 to attach the ring 16 through a threaded holes at the rear of the ring 16 (not shown). The ring 16 has an opening 16D to provide a passage for a cable 5, an outer thread 1 6B for the locking nut 11 and a curved inner face 16C having a curvature radius equal to the radius of the ball-shaped camera 13. The locking cover 12 has a flanged rim 12A, a cutout 12B and an inner elongated cylindrical cavity 12C having a hemispherical top with a curvature radius equal to the radius of the ball-shaped camera 13. The cutout 12B with a width slightly larger than the diameter of the lens pane 13A provides for adjusting the position of the lens pane for up to 90° or more about the central axis of its rotation throughout the length of the cutout 12B as shown in FIGS. 4A–4C. The diameter of the lens pane 13A is made to accommodate the wider view of a wide angle lens and the width of the cutout 12B can be smaller than the diameter of the lens pane 1 3A if the angle of view of the lens of the ball-shaped camera 13 is a narrow angle. Accordingly the width and length of the cutout 12B can vary along with the type of lens used with the ball-shaped camera 13 and the angle of view of the lens.

The locking nut 11 has a thread 11B which is a complementary thread to thread 16B of the ring 16 and an inner shoulder 11A for engaging and tightening the rim 12A of the locking cover 12 to the ring 16 and for gripping and locking the ball-shaped camera 13 into position.

Instead of the thread 11B of the locking nut 11 and the thread 16B of the ring 16, shown in FIG. 2B it is possible to use a bayonet coupling 100 shown in FIG. 2C, thereby simplifying the locking to a twist of a bayonet locking socket ill with its bayonet cutouts 11B onto a ring 116 having projected matching flaps 116A as shown in FIG. 2C or having other shapes of socket cutouts and/or projecting matching flaps or pins.

Figures 3A, 3B, 3C:
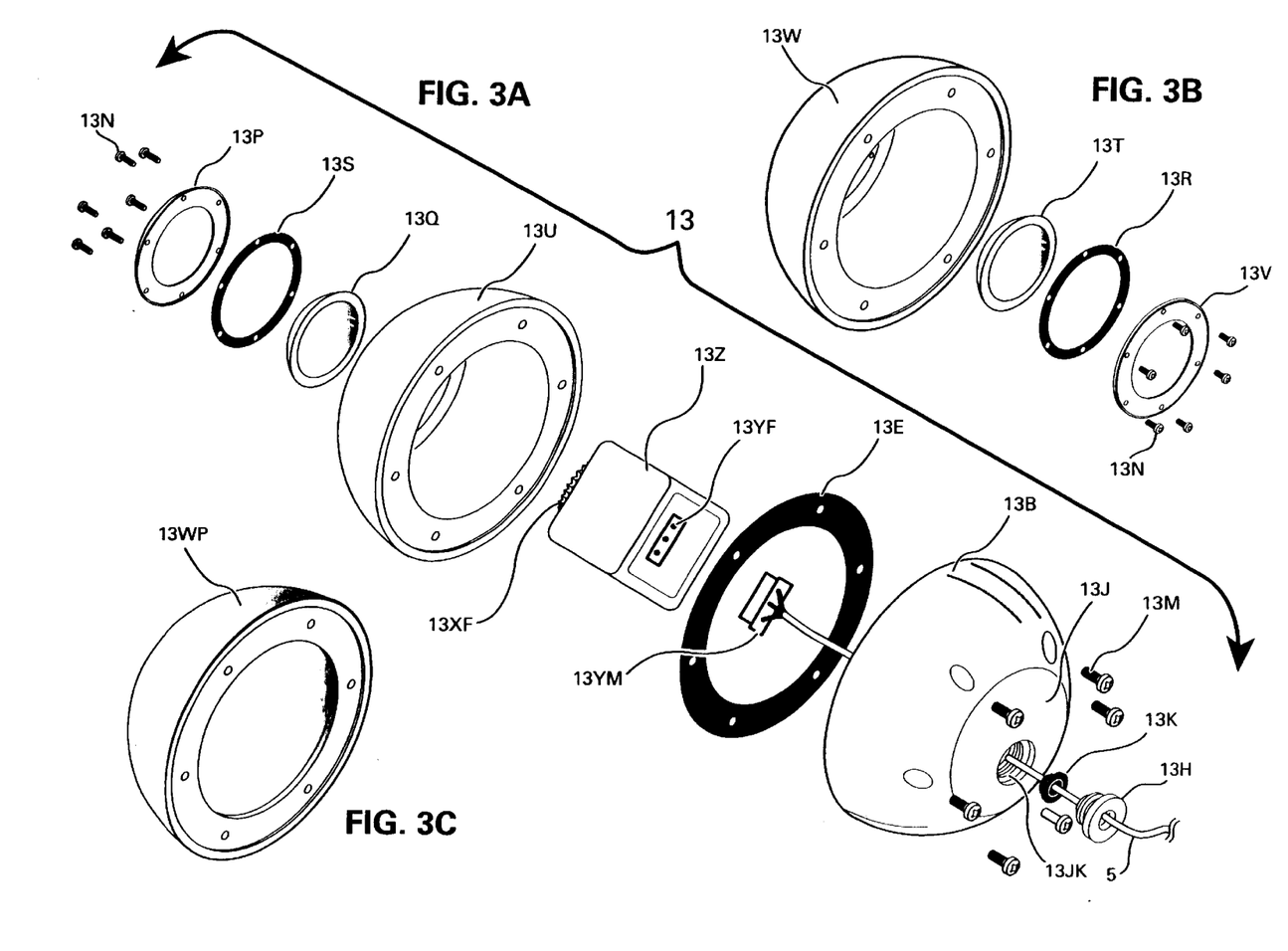
FIG. 3A is an exploded view of the ball-shaped television camera of FIGS. 2A–2C.
FIGS. 3B and 3C are exploded perspective views of front segments of the TV camera case of two different embodiments.

The ball-shaped camera case 13 shown in FIG. 3A can be made by a metal molding or machining, or by an injection of a plastic material. The ball-shaped camera case 13 shown in FIG. 3A comprises two (front and rear) segments 13U and 13B of a bisected ball, with a flat portion 13J along with a cable inlet 13JK at the rear of the rear segment 13B. A seal 13E provides the sealing between the rims of both segments 13U, 13B that are attached together using screws 13M or any other fasteners. The connecting cable 5 is sealed by the tapered seal 13K, which is locked onto the cable by a nut 13H. The other side of the cable 5 is terminated with a connector 13YM which is plugged into a connector 13YF of a camera body 13Z and the camera body 13Z is secured into place by a well known camera holder (not shown)

FIGS. 3A, 3B and 3C show three front segments 13U, 13W and 13WP, respectively of the ball-shaped camera case 13. The front segment 13U of FIG. 3A comprises a curved front pane 13Q sealed by a seal 13S and is attached to the front of the segment 13U by a circular, curved front pane holder 13P and screws 13N or any other suitable fasteners. A focus ring 13XF, which is partially shown is a focus ring of a lens imbedded into the camera body 13Z and it can be accessed from the outside for adjustment of the focus by removing the pane holder 13P, seal 13S and pane 13Q. The curvature radius of front pane 13Q and the front pane holder 13P is equal to the radius of the camera case 13 and therefore the front surface of the segment 131J appears as a perfect, all rounded semi-hemispheric dome. Otherwise the ball-shaped camera case 13 is watertight sealed for outdoors use, at all weather locations. For indoors or for the installation under cover, seals 13S, 13E and 13K are not needed and the ball-shaped camera case 13 can be assembled without seals.

The front segment 13W shown in FIG. 3B is different from the front segment 13U of FIG. 3A. The front pane 13T is mounted from the inside of the segment by using the seal 13R and the front pane holder 13V fastened by the screws 13N or other fasteners. By this arrangement the front of the segment 13W and thereby the front of the ball-shaped camera case 13 can be made inconspicuous without a pane holder and/or visible screws holding the pane into place. This provides a better look for a ball-shaped camera mounted inside well decorated interiors.

Instead of the separated front pane 13T along with the seal 13R, the holder 13V and the screws 13N as shown in FIG. 3B, it is possible to inject a complete segment 13WP shown in FIG. 3C, using a transparent plastic material such as acryl or polycarbonate, and thereby transforming the segment body 13WP itself to a front pane. Such transparent material can be tinted or can be of the well known smoked type that does not reveal the interiors of the camera case, i.e., the lens and the camera body cannot be seen from the outside.

Though the ball-shaped camera case 13 of FIG. 3A is shown bisected at its core center, the ball-shaped camera case can be constructed from more than two segments or can be constructed from two non-bisected segments, as long as the portions of the camera case that contact or engage the curved inner face 16C of the ring 16 and the semihemispheric curvature portion 12C of the locking cover 12 remain circular having a radius equal to the radius of the ball-shaped camera case 13.

As shown in FIG. 4A the lens pane 13A can be locked in a straight position along the axis X of the locking cover, or it can be locked into a bent position of about 90° shown in FIG. 4C, or it can be locked in a random bent position between those of FIG. 4A and FIG. 4C such as the position shown in FIG. 4B. FIG. 4D illustrates how the 90° bent position of the pane, or any other random bent position, can be rotated fully for a full 360° rotation around the axis X of the locking cover and about the center core of the ball-shaped camera 13.

Figure 5A:
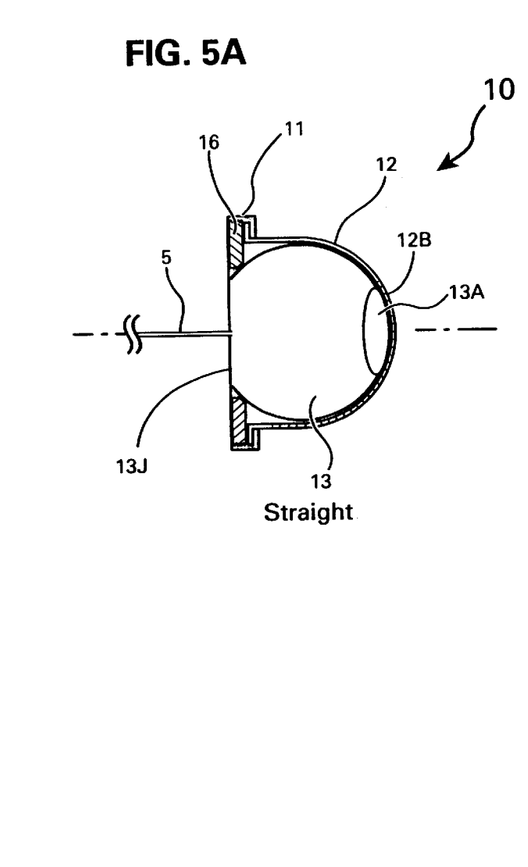
FIGS. 5A, 5B and 5C are sectional views of the TV camera and its holder showing the cable passage through the holder of the present invention.
Figure 5B:
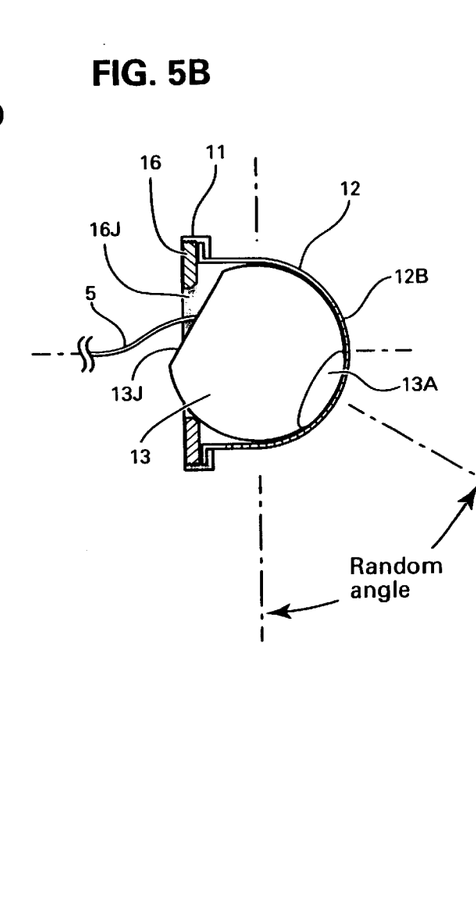
Figure 5C:
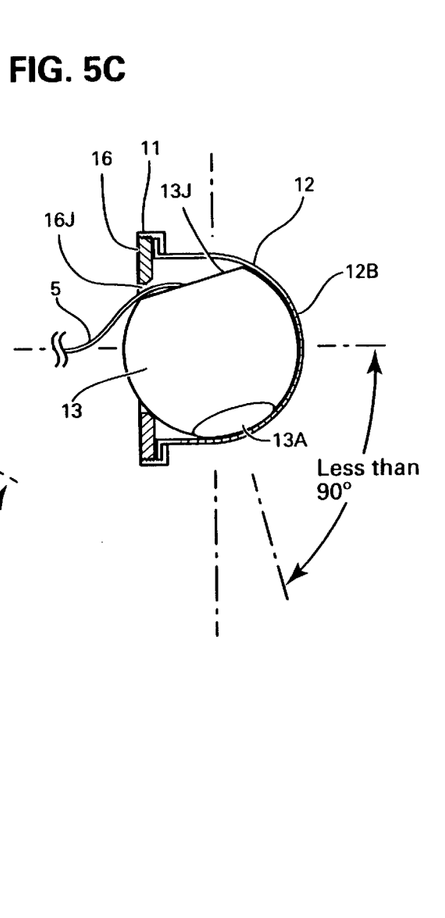

FIGS. 5A, 5B and, 5C are sectional views of the ball-shaped camera 13 and its holder 10. FIG. 5A shows the lens pane 13A in its straight position along its axis; FIG. 5B shows the lens pane 13A in a randomly bent position, and FIG. 5C shows the lens pane 13A in less than a 90°-bent position. Also shown is the cable 5 that passes through the ring 16. The truncated section 13J of the ball-shaped camera 13 provides passage 16J for the cable 5 through the ring 16 when the joint is bent as shown in FIG. 5C. It becomes obvious from the sectional view of FIGS. 5B and 5C that the cable passage is wider when the lens pane is locked into a smaller bent, or if the ball-shaped camera 13 is truncated by a larger section 13J; such smaller bent or a larger truncated section also provides for a thicker cable to pass through. However, the larger truncated section 13J reduces the joint gripping power because a smaller surface of the ball-shaped camera 13 engages the curved inner face 16C of the ring 16 and the inner surface of the locking cover 12. Accordingly it is possible to construct variety of camera holders with a different gripping power, and for a different cable thickness on the basis of the size of the truncated section 13J, or to provide for a different cable thickness by limiting the bending angles through a shorter cutout 12B.

Figure 6A:
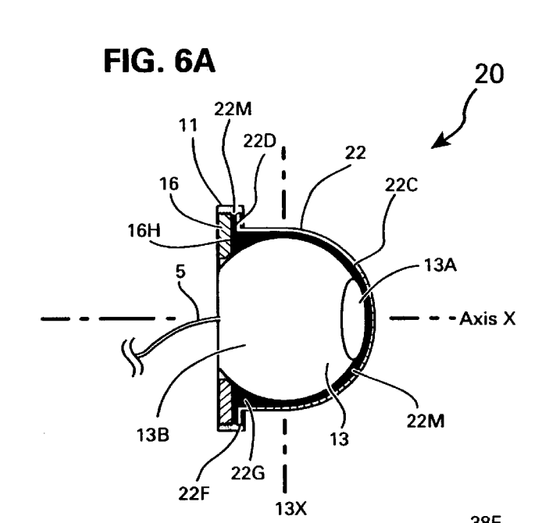
FIGS. 6A, 6B, 6C and 6D are sectional views showing the different mounting methods for the cameras having the holders of the present invention.

The ball-shaped camera 13 and the camera holder 10 may be installed outdoors exposed to rain and/or snow and therefore it requires a watertight sealing for which a seal is provided inside the locking cover 22 of the camera holder 20 shown in FIG. 6A. The entire inner surface 22C of the locking cover 22 and its flange area 22D are coated with rubber or other sealing material 22M having a uniform coating thickness, except for a part 22G surrounding the ball-shaped camera 13 and extending from the central core axis 13X of the ball-shaped camera 13 to the surface 16H of the ring 16 for sealing the inner cavities between the ball-shaped camera 13 and the locking cover 22 as shown in FIG. 6A. Accordingly, when the locking cover 22 is tightened by the locking nut 11 it engages the coated seal with the outer surface of the ball-shaped camera 13 to seal all the gaps between the locking cover 22 and the outer surface of the ball-shaped camera 13 as well as the gap between the surface 22D of the locking cover and the flange surface 16H of ring 16.

Figure 6B:
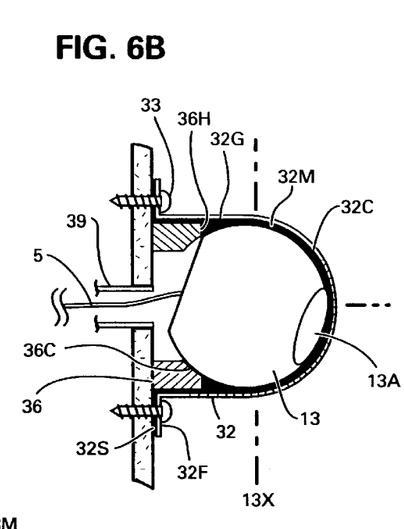
Figure 6C:
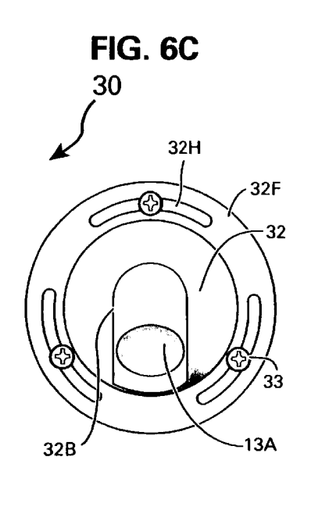

Shown in FIG. 6B is another sealed camera holder 30 comprising a ring 36 and a locking cover 32. The ring 36 which allows the cable 5 to pass through it toward a cable duct or pipe 39 embedded in a wall or any other fixture with a flat surface has curved inner face 36C having a curvature radius equal to the radius of the ball-shaped camera 13. FIG. 6C is a top view of the camera holder of FIG. 6B.

A flange 32F of the locking cover 32 which is larger than the flange 12D of FIG. 2B or the flange 22F of the locking cover 22 of FIG. 6A, has holes 32H for mounting a flange surface 32S directly onto a wall, or a ceiling, or onto other fixtures with a flat surface, using screws 33 or other fasteners. The entire inner surface 32C of the locking cover 32 and its flange area 32S is coated with a rubber or other sealing material 32M having a uniform coating thickness, except for a part 32G surrounding the ball-shaped camera 13 and extending from the center core axis 13X of the ball-shaped camera 13 to the surface 36H of the ring 36 for sealing the inner cavities between the ball-shaped camera 13, the locking cover 32 and the ring surface 36H as shown in FIG. 6B. Accordingly, when the locking cover 22 is tightened by the screws 33 it engages the ring 36 with the ball-shaped camera 13 as well as the coated seal with the outer surface of the ball-shaped camera 13 to lock the ball-shaped camera 13 into place and to seal all the gaps between the locking cover 32 and the outer surface of the ball-shaped camera 13 as well as the gap between the surface of the ring 36H and the inner surface of the locking cover 32, the gap between the flange surface 32S of the locking cover and the flat surface of the wall, the ceiling or any other fixture with flat surface to which the locking cover 32 is attached. The holes 32H shown in FIG. 6C are elongated cutouts, allowing for adjustments in the positioning of the locking cover 32 about its central axis X.

FIG. 6B also clearly shows that the locking cover 32 can be used without seal 32M for mounting the ball-shaped camera 13 indoors, for which no water tight sealing is needed. Moreover, using the ring 36 to grip and lock the camera 13 between the curved inner face 36C of the ring 36 and the hemispheric top 32C of the locking cover 32 when the locking cover is fastened to a wall, a ceiling or other fixtures having a flat surface is in fact a simple two piece holder setup, which allows a ball-shaped camera to be adjusted and locked into place simply by means of fastening the locking cover 32 to a flat fixture.

Figure 6D:
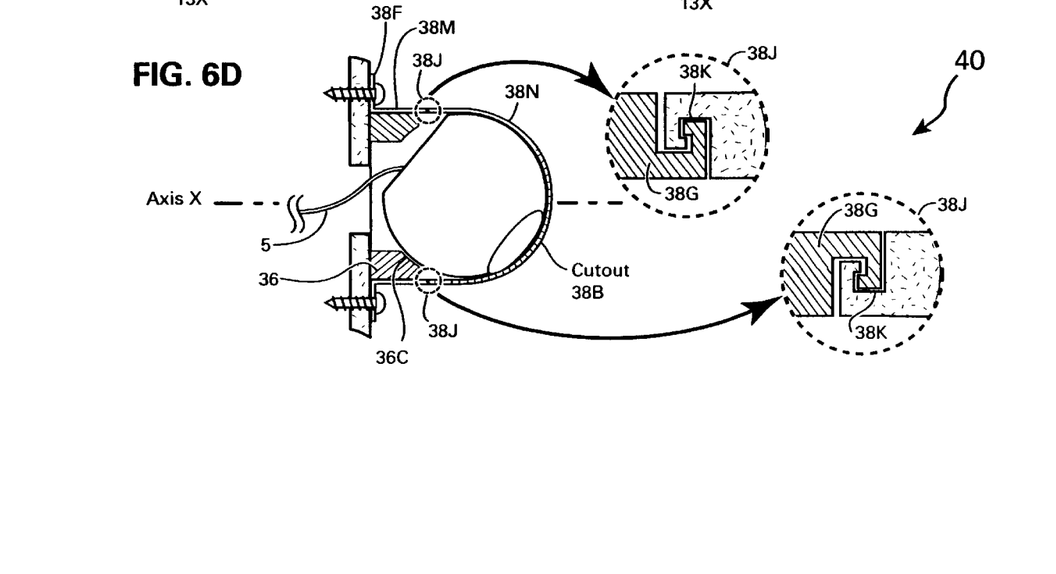

Instead of the larger flange 32F with the elongated cutouts 32H the locking cover 38 of the camera holder 40 can be made of two portions, the lower portion 38M and the upper portion 38N, shown in FIG. 6D. The lower and upper portions are attached by a surrounding hook 38G of the lower portion 38M which is snapped into a surround slot 38K of the upper portion 38N to form a rotating joint 38J. Many different shapes can be employed to hook the lower and upper portions 38M and 38N into a rotating joint. However, regardless of the shape, position and/or the structure of the joint, the hooked-up joint 38J provides for a free rotation of the upper portion 38N around its central axis X against a stationary lower portion 38M which has its flange 38F mounted onto a flat surface. By such arrangement the simplified mounting of a ball-shaped camera 13 using a two part mount does not need to be limited to a flat surface only.

Figures 7A, 7B, 7C:
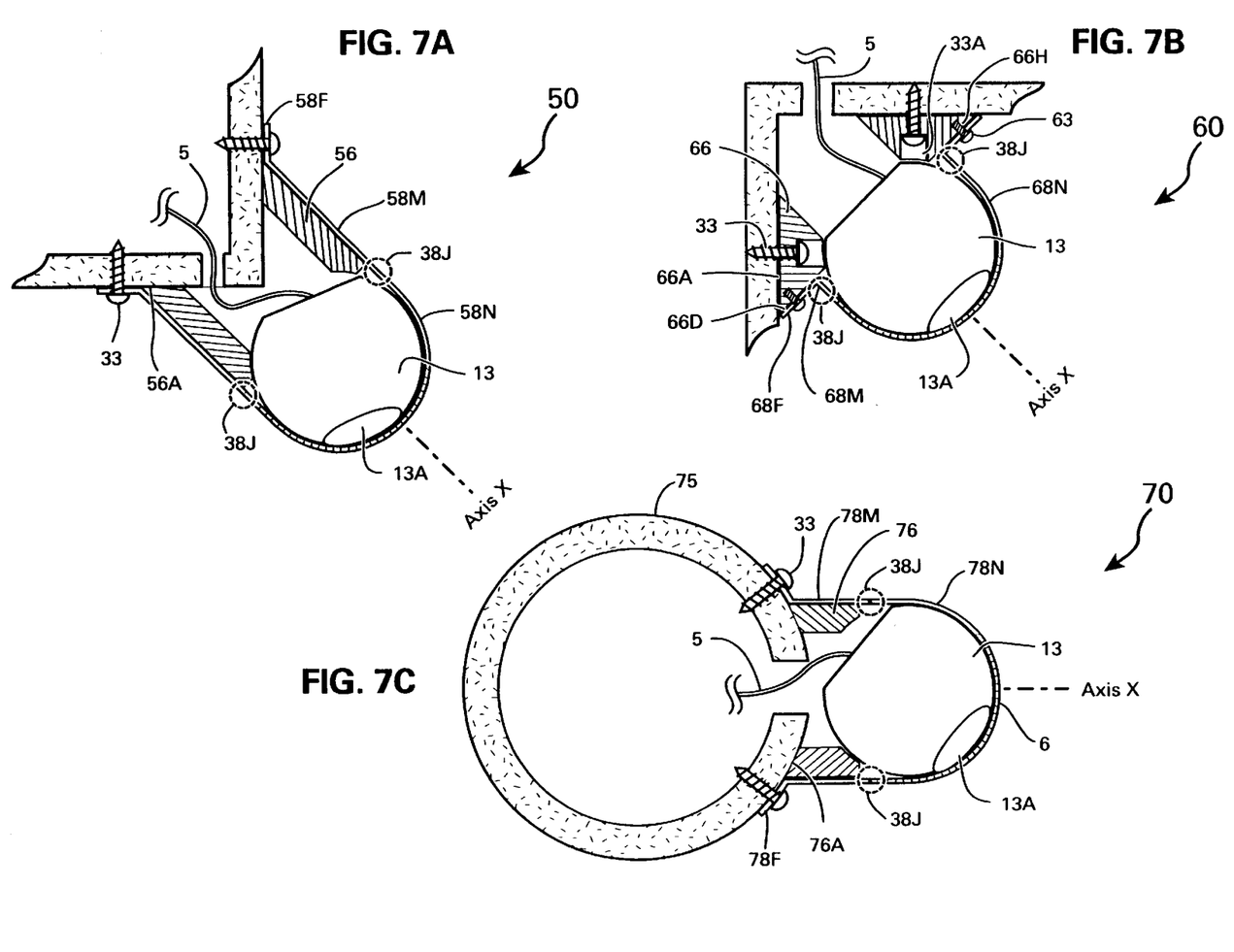
FIGS. 7A, 7B and 7C are sectional views of variations of mounting holders of FIG. 6D for different fixed structures.

Shown in FIGS. 7A–7C are three embodiments of camera holders 50, 60 and 70, respectively for mounting the ball-shaped camera 13 onto fixtures other than flat surfaces, such as an edge of a column shown in FIG. 7A, a wall-ceiling corner shown in FIG. 7B and a round pole shown in FIG. 7C.

A lower portion 58M of the locking cover of the camera holder 50 shown in FIG. 7A along with the ring 56 are shaped to fit an edge of a column. A mounted surface 56A of the ring 56 is cut in this instance to fit a 90° –angular the edge of the column. Similarly, the flange 58F of the lower portion 58M is bent and cut to fit the 90° –angular edge of the column. It is clear that the joint 38J shown in FIG. 7A, which is similar to the joint 38J of FIG. 6D provides for a free rotation of the upper portion 58N about its axis X when the screws 33 are not tightly secured and locks the holder into place along with the ball-shaped camera 13 when the screws 33 are tightly fastened.

A lower portion 68M of the locking cover of the camera holder 60 shown in FIG. 7B along with the ring 66 are shaped to fit the 90° –corner of a wall-ceiling structure, wherein the mounted surface 66A of the ring 66 is shaped to be mounted onto the corner structure using screws 33 through the mounting holes 33A. A surface 66D of the ring 66 provides holes or tapped holes 66H for mounting the screws 63 which attach a flange 68F of the lower portion 68M of the locking cover. Otherwise the joint 38J which is similar to the joint 38J of FIG. 6D provides for a free rotation of the upper portion 68N about its axis X when the screws 63 are not tightly secured and locks the holder into place along with the ball-shaped camera 13 when the screws 63 are tightly fastened.

A lower portion 78M of the locking cover of the camera holder 70 shown in FIG. 7C along with the ring 76 are shaped to fit a given curvature of a pole structure wherein the mounted surface 76A of the ring 76 is cut to fit the curvature of a pole 75. Similarly, the flange 78F of the lower portion 78M is also shaped to fit the curvature of the pole 75. Here too, it is clear that the joint 38J which is similar to the joint 38J of FIG. 6D provides for free rotation of the upper portion 78N about its axis X when the screws 33 are not tightly secured and locks the holder into place along with the ball-shaped camera 13 when the screws are tightly fastened.

Figure 8A:
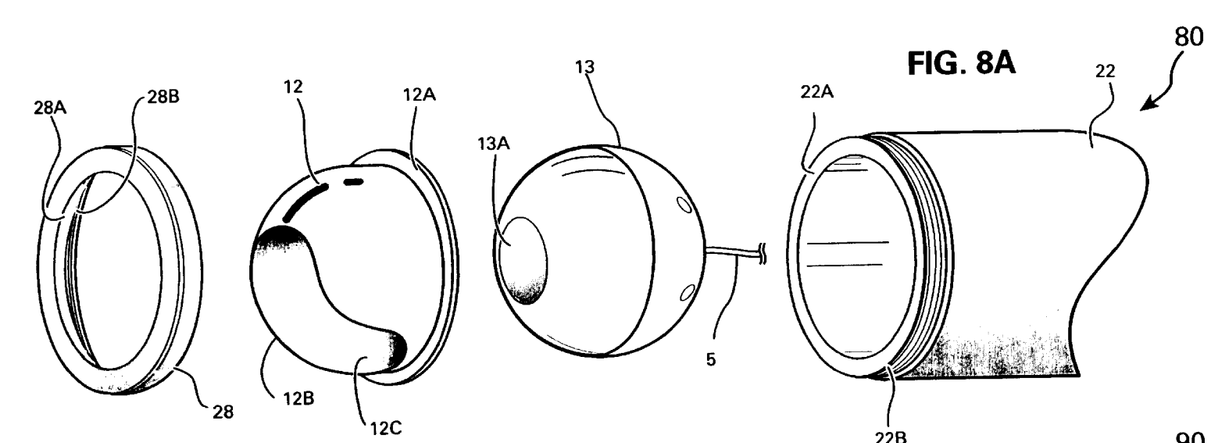
FIGS. 8A and 8B are perspective exploded views of other embodiments of the camera holders, respectively of the present invention.
Figure 8B:
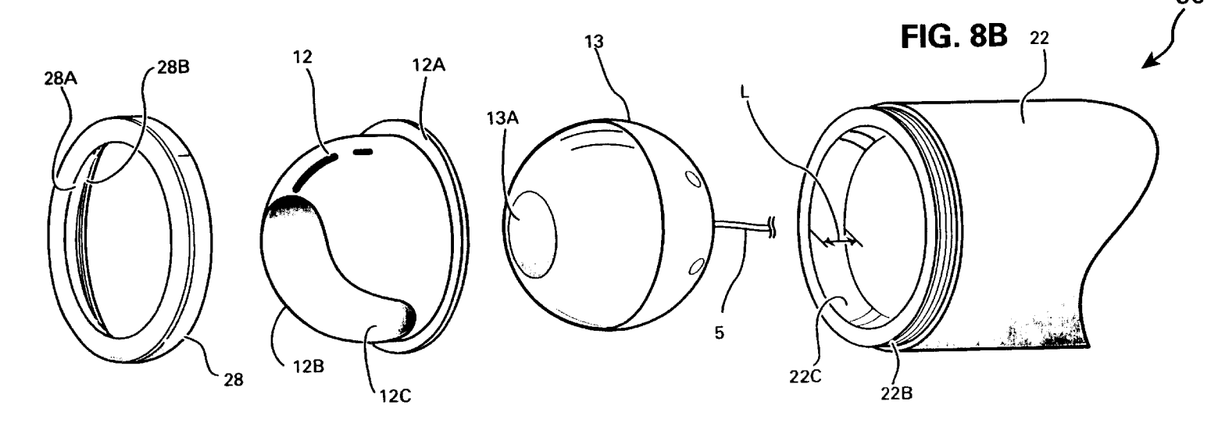

Shown in FIGS. 8A and 8B are two other embodiments of simplified camera holders 80 and 90, respectively, for mounting the ball-shaped camera 13 directly onto a pipe or a pole 22 having its inner rim with a sharp edge 22A (FIG. 8A) or a curved edge 22C having a curvature having a radius equal to the radius of the ball-shaped camera 13 for supporting the ball-shaped camera 13 and with its outer end 22B (FIG. 8B) threaded to accommodate the threaded portion 2813 of the locking nut 28. The locking nut 28 has an inner shoulder 28A that engages flange 12A of the locking cover 12. Such arrangement will allow to lock the locking cover 12 onto the ball-shaped camera by tightening the locking nut 28 against the pole or pipe 22.

Figure 9A:
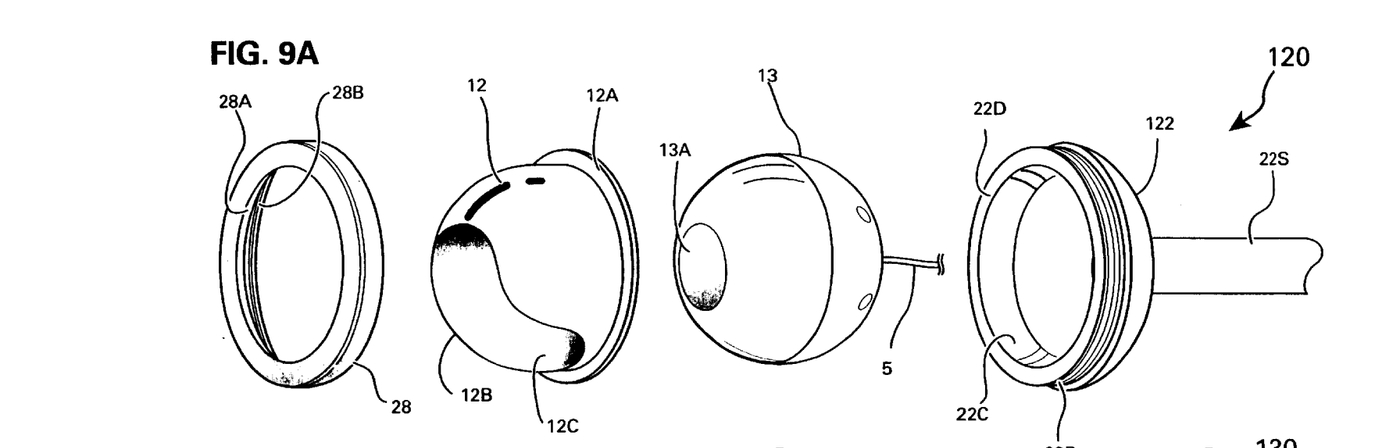
FIGS. 9A and 9C are a perspective and a view respectively of the camera holder of yet other embodiment of the present invention.
Figure 9B:
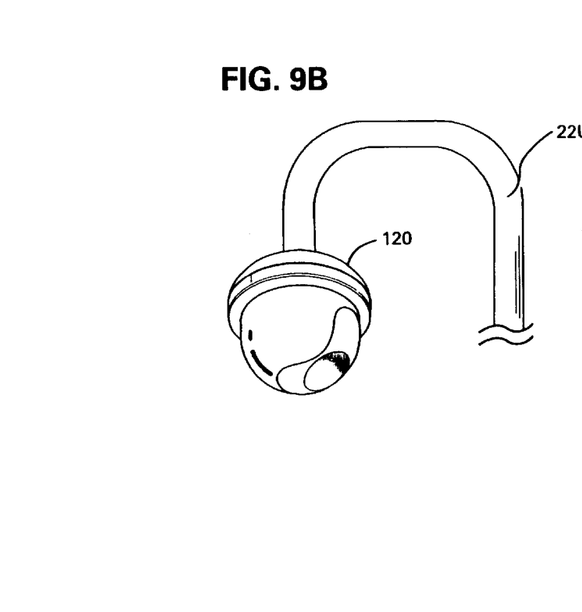
FIG. 9B is a perspective view of the holder of FIG. 9A with a U-shaped pipe.
Figure 9C:
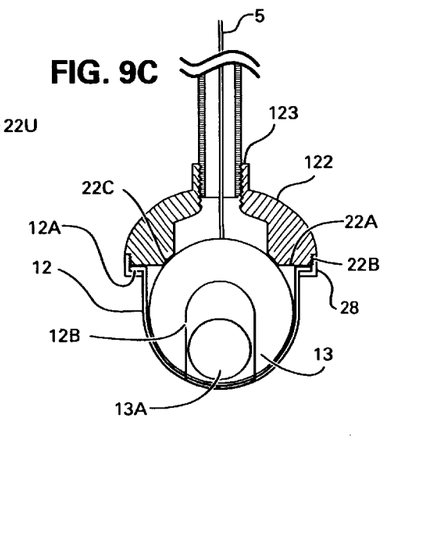
Figure 9D:
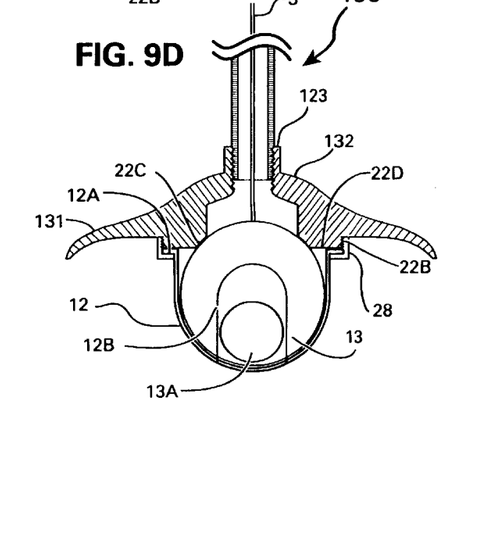
FIG. 9D is a sectional view of a camera holder of a further embodiment of the invention.

The gripping power that locks the ball-shaped camera 13 into place depends upon the length L of the curved rim 16C or 22C of the ring 16 or the pipe 22. A rim with longer curvature increases the gripping power, while a rim with a short curvature or a pointed edge 22A of FIG. 8A, i.e. zero length curvature, offer a substantially lower gripping power. However, because the gripping power of the hemispheric portion 12C is very large the length of the curved rims of all differently ring shaped holders 16, 36, 56, 66 and the inner rim of the pipe 22 can be made shorter or sharp-edged. FIG. 9A shows a pipe adapter 122 and FIG. 9D shows a pipe adapter 132 described below, which can be also made shorter or sharp-edged. FIGS. 9A to 9D show further embodiments of the camera holders of the present invention. As seen from FIG. 9A, when a pipe 22S is smaller than the diameter of the diameter of the ball-shaped camera 13 an adapter 122 can be used in a camera holder 12D. FIG. 9C is a partial sectional view of the holder FIG. 9A. The adapter 122 has a curved inner face 22C having a curvature radius equal to the radius of the ball-shaped camera 13, an outer thread 22B for the locking nut 28 or flaps I 16A for a bayonet socket 111 shown in FIG. 2C, and an opening 123 including a complementary thread to the thread of the pipe 22S for mounting the adapter 122 onto the pipe 22S and for providing a passage to the camera cable 5 as shown in FIG. 9C. The adapter 122 provides thereby the acorn-shaped camera holder 120 which can be mounted with a "U" shape pipe 220 shown in FIG. 9B, or an "L" shaped pipe (not shown) or a pendant mount of FIG. 9C.

An adapter 132 of camera holder 130 shown in FIG. 9D is further provided with a surrounding flange 131, that is shaped like an umbrella for use as a sunshield or a rain cover for an outdoor pendant mounted camera holder 130.

The cutout 12B of the locking cover 12 is extended from the central axis X toward the flange 12A throughout, such as shown in FIG. 1A or FIG. 2B. However, depending on the overall positioning requirement for a given ball-shaped camera 13 the cutout 12B can be shaped in any length and in multiple direction or can have any random cut shape providing that the remaining uncut hemispheric portion of the locking cover 12 has a sufficient surface to grip and lock the ball-shaped camera into place.

Figure 10A:
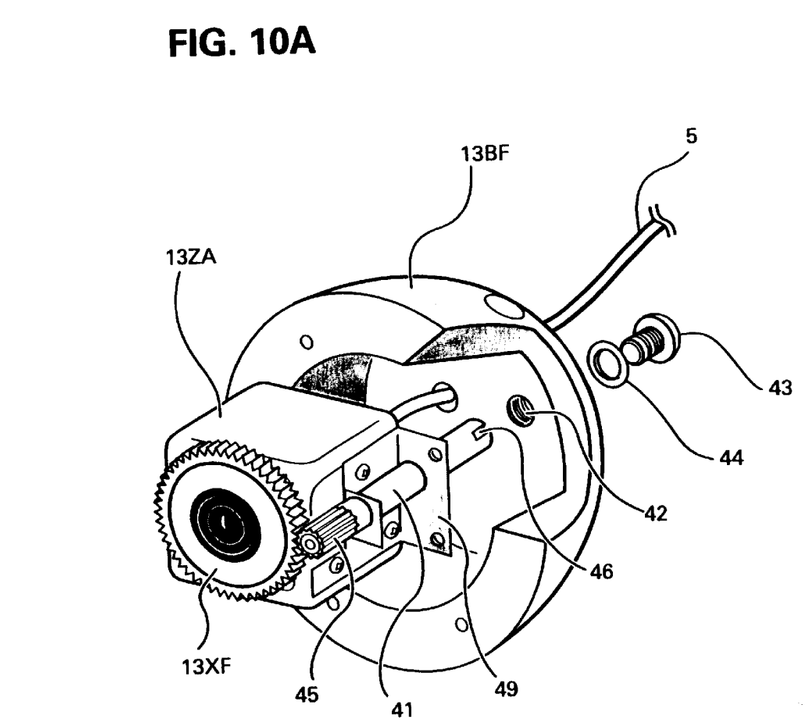
FIGS. 10A and 10B are perspective and partially exploded views of a rear adjustment of the focus ring of the camera shown in FIG. 3A.
Figure 10B:
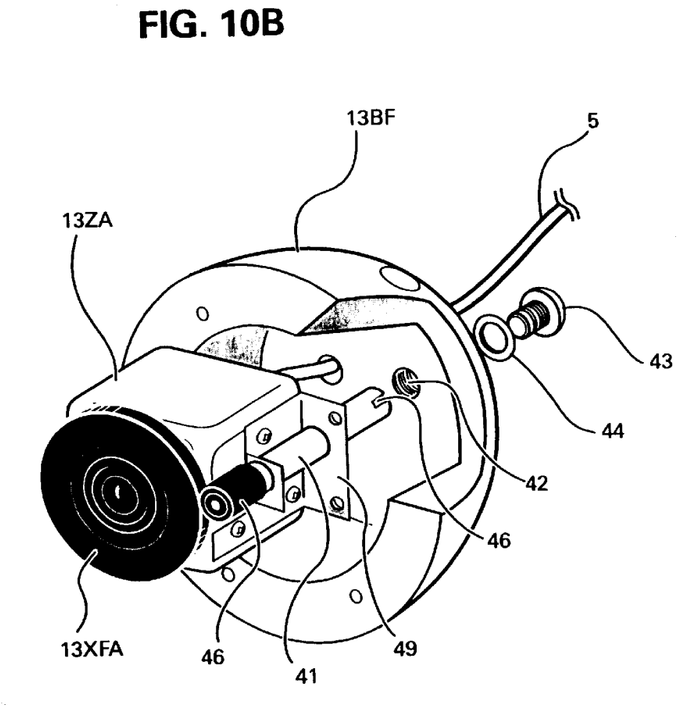

Shown in FIGS. 10A and 10B is a camera 13ZA having a focus ring 13XF (FIG. 10A), 13XFA (FIG. 10B). The focus ring has a diameter slightly larger than the width of the camera body. The camera 13ZA comprises a holder 49, a rod 41 extending all the way from the focus ring 13XF or 13XFA to the opening 42 in the rear of the segment 13BF which is a modified segment 13B of FIG. 3C having an opening 42 for focus adjustment. The opening 42 provides for accessing the rod from the rear of the ball-shaped camera 13 by removing the screw 43, which seals along with seal 44 the opening 42. Alternatively other seals and locking means can be employed to seal the opening 42. The rod 41 may have a gear 45 (FIG. 10A) at its one end for engaging a complementary geared focus ring 13XF. As shown in FIG. 10B the rod 41 may comprise a rubber roller 46 at one end thereof to engage the focus ring 13XFA by roller friction. The other end of the rod 41 has a slit 46 providing for a screw driver adjustment of the focus ring from the rear end of the ball-shaped camera 13.

Figure 11:
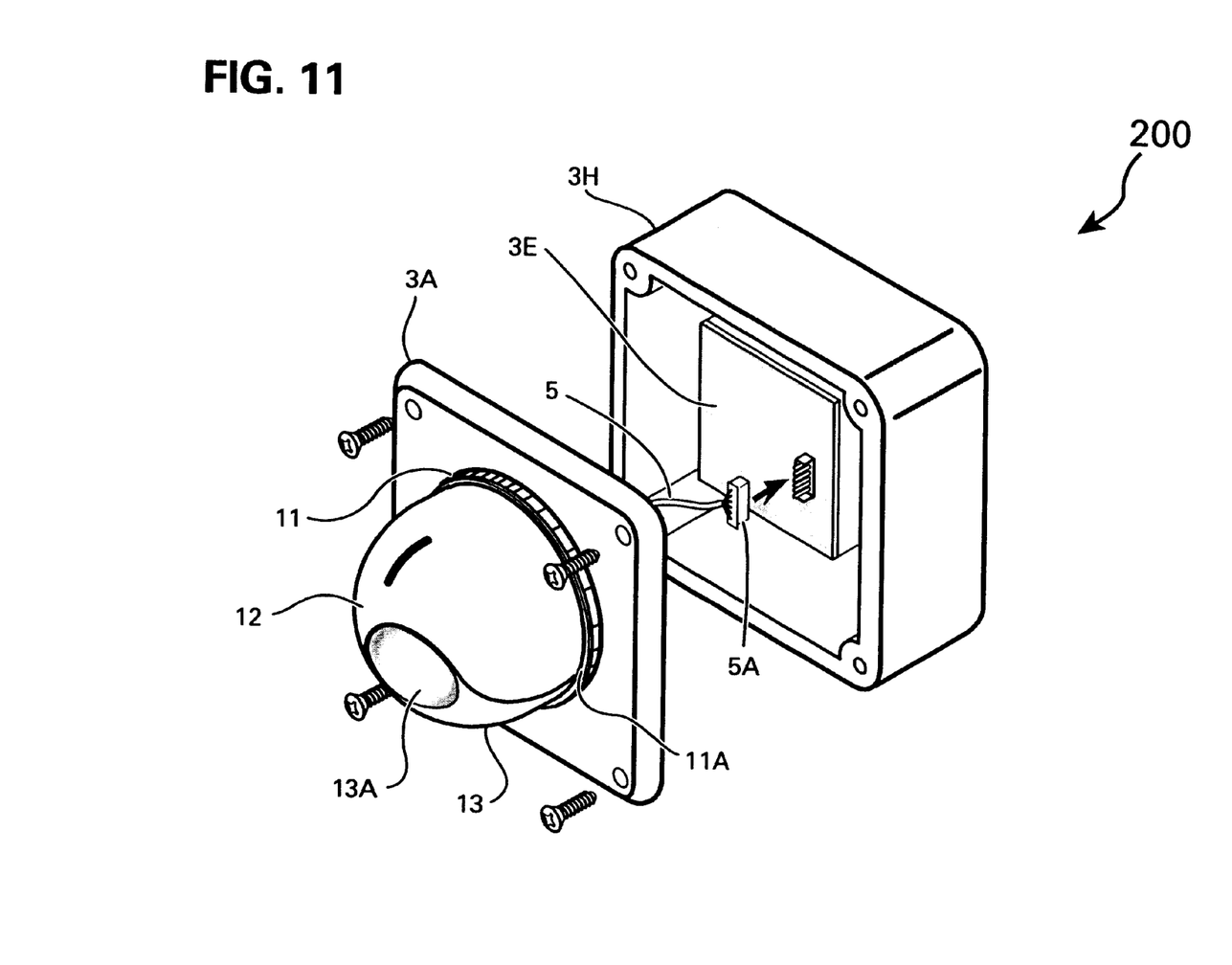
FIG. 11 is a perspective view of a camera mount with a camera case.

A mount 200 is shown in FIG. 11. The mount includes a case 3H and a cover 3A. The mount cover 3A can be a plain cover with holes to support the ring 16 or its many variations to a wall or a ceiling or to any other structure. The case 3H may incorporate the terminals for connecting power and signal wires and cables (not shown) and may also comprise a power supply unit, or a power adapter and/or other electronic circuits 3E. The mount shown in FIG. 11 is rectangular in shape, but can be made square or circular or of any other desired shape for mounting it on structural surfaces or recessed into a wall or a ceiling or a pole. The case 3H may comprise seals and sealed inlets for the cables (not shown) or threads for conduit pipes (not shown) or it can be a standard electrical box, and the cover 3A may be a cover of a standard electrical box. The cover 3A may also be made circular with a surrounding thread or with other suitable attaching means for attaching it directly onto a pipe or a pole having a larger diameter than the diameter of the ball-shaped camera 13 instead of attaching it to a circular shaped case 3H.

Commonly used mounts can be provided with means for fixedly attaching a ring shaped holder 16 or 116 of FIGS. 1B and 1C. However, the cover 3A of the mount 200 shown in FIG. 11 comprises the ring 16 or 116 of FIGS. 2A and 2C as an integral part, molded or otherwise. The cable 5 is shown terminated with a connector 5A which provides for an easy hook-up of the ball-shaped camera 13 with the mount case 3H and its electronic circuit 3E.

The ball-shaped camera 13 is illustrated throughout the application with its pane 13A highlighted. However, in the actual production of the camera cases, a tinted or a smoked pane may be used and the surrounding segments, holders and cover may be applied with a paint or coloring that matches the color of the pane; thereby the pane position will not be clearly visible.

It will of course, be understood by those skilled in the art that the particular embodiment of the invention here presented is by way of illustration only, and is meant to be in no way restrictive, therefore, numerous changes and modifications may be made, and the full used of equivalents resorted to, without departing from the spirit or scope of the invention as outlined in the appended claims.

What is claimed is:

1. A camera holder comprising:
    a ball-shaped camera case having a transparent front pane and a truncated rear end portion having an electrical cable inlet at said truncated rear end portion;
    a ring-shaped holder having a first fastening means and one of a sharp-edge inner-rim and a curved inner-rim having a curvature radius equal to a radius of said ball-shaped camera case for supporting and locking said ball-shaped camera case, and including means for attaching said ring-shaped holder to a structural body, said ring-shaped holder having an opening for providing a passage for said electrical cable to said structural body through said ring-shaped holder;

an elongated cylindrical cover including a flanged rim at one end thereof and a portion of a hemispherical shape with a curvature radius equal to a radius of said ball-shaped camera case at another end thereof and further having one of a cutout of a random shape which is larger than said front pane and an elongated cutout having a width commensurate with the angle of view of a lens of said ball-shaped camera, extending from a center of said portion of a hemispherical shape toward said flanged rim for providing an optical path for said lens and for gripping said ball-shaped camera case inside said portion of a hemispherical shape of said elongated cylindrical cover and for providing said ball-shaped camera case with positioning capacity of said lens extending throughout said cutout; and a locking nut having a second fastening means complementary to said first fastening means for engagement therewith and an inner shoulder for attaching and locking said elongated cylindrical cover to said ring-shaped holder by engaging said flanged rim with said inner shoulder and tightening said second fastening means of said locking nut with said first fastening means and locking said ball-shaped camera between one of said inner sharp edged rim and said curved rim and said portion of a hemispherical shape, wherein said elongated cylindrical cover can be rotated for positioning said cutout around an axis of said portion of a hemispheric shape and said lens can be adjusted to any position within said cutout and wherein said electrical cable passing through said ring-shaped holder is not obstructed.

2. The camera holder according to claim 1, wherein said ring-shaped holder is an integral part of a cover of a case for mounting the ball-shaped camera case to said structural body and wherein said integral ring-shaped holder includes a passage for said cable to said mounting case.

3. The camera holder according to claim 2, and further comprising a layer of a seal covering all internal surface of said elongated cylindrical cover including a surface of said flanged rim for sealing gaps and cavities between said elongated cylindrical cover and said ball-shaped camera case and between said flanged rim and said ring-shaped holder for providing a watertight sealed camera holder.

4. The camera holder according to claim 3, wherein said first fastening means includes one of a set of flaps and a set of pins and wherein said second fastening means of said locking nut includes one of a set of matching cutouts to said flaps and a set of matching pins to form a bayonet joint.

5. The camera holder according to claim 3, wherein said ring shaped holder is one of a pole and a pipe having one of a sharp edged inner-rim and a curved inner—rim having a curvature radius equal to a radius of said ball-shaped camera case.

6. The camera holder according to claim 3, wherein said ring shaped holder is an adapter ring having an inner opening with a thread for a pipe having a diameter smaller than a diameter of said ball-shaped camera case.

7. The camera holder according to claim 6, and further comprising a surrounding flange formed around said adapter for shielding said ball-shaped camera case from a direct sunlight and covering said ball-shaped camera from rain and snow.

8. The camera holder according to claim 2, wherein said first fastening means includes one of a set of flaps and a set of pins and wherein said second fastening means of said locking nut includes one of a set of matching cutouts to said flaps and a set of matching pins to form a bayonet joint.

9. The camera holder according to claim 2, wherein said structural body is one of a circular case, a rectangular case and a square case and wherein said cover is used for mounting said ball-shaped camera case to one of a wall, a ceiling and other planes and surfaces, and wherein said front cover has a shape of one of circular, rectangular and square and is of a matching size and shape to said one of said circular case, said rectangular case and said square case.

10. The camera holder according to claim 9, wherein said one of said circular case, said rectangular case and said square case comprises at least one of an electrical cable inlet and an inlet for a conduit electrical pipe.

11. The camera holder according to claim 10, wherein said one of said circular case, said rectangular case and said square case further comprises one of a power supply unit, an AC adapter, a connector board and another electronic circuit and combinations thereof.

12. The camera holder according to claim 9, wherein said one of said circular case, said rectangular case and said square case further comprises one of a power supply unit, an AC adaptor, a connector board and another electronic circuit and combinations thereof.

13. The camera holder according to claim 1, and further comprising a seal for sealing a gap between said ring-shaped holder and said structural body and a layer of a seal covering all internal surface of said elongated cylindrical cover including a surface of said flanged rim for sealing gaps and cavities between said elongated cylindrical cover and said ball-shaped camera case and between said flanged rim and said ring-shaped holder for providing a watertight sealed camera holder.

14. The camera holder according to claim 13, wherein said first fastening means includes one of a set of flaps and a set of pins and wherein said second fastening means of said locking nut includes one of a set of matching cutouts to said flaps and a set of pins to form a bayonet joint.

15. The camera holder according to claim 1, wherein said first fastening means includes an outer thread on said ring-shaped holder and said second fastening means includes a thread in said locking nut.

16. The camera holder according to claim 15, wherein said ring-shaped holder is one of a pole and a pipe having a sharp edged inner-rim and a curved inner-rim having a curvature radius equal to a radius of said ball-shaped camera case.

17. The camera holder according to claim 15, wherein said ring shape holder is an adaptor ring having an inner opening having a thread for a pipe having a diameter smaller than the diameter of said ball-shaped camera ease.

18. The camera holder according to claim 17, and further comprising a surrounding flange formed around said adaptor for shielding said ball-shaped camera case from a direct sunlight and covering said ball-shaped camera from rain and snow.

19. The camera holder according to claim 1, wherein said first fastening means includes one of a set of flaps and a set of pins and wherein said second fastening means of said locking nut includes one of matching cutouts to said flaps and said pins to form a bayonet joint.

20. The camera holder according to claim 19, wherein said ring shaped holder is one of a pole and a pipe having one of a sharp edged inner-rim and a curved inner-rim having a curvature radius equal to a radius of said ball-shaped camera case.

21. The camera holder according to claim 19, wherein said ring shaped holder is an adaptor ring having an inner opening having a thread for a pipe having a diameter smaller than a diameter of said ball-shaped camera case.

22. The camera holder according to claim 21, and further comprising a surrounding flange formed around said adaptor for shielding said ball-shaped camera from a direct sunlight and covering said ball-shaped camera from rain and snow.

23. The camera holder according to claim 1, wherein said ring—shaped holder is one of a pole and a pipe having one of a sharp edged inner-rim and a curved inner-rim having a curvature radius equal to a radius of said ball-shaped camera case.

24. The camera holder according to claim 1, wherein said ring shaped holder is an adaptor ring having an inner opening having a thread for a pipe having a diameter smaller than a diameter of said ball-shaped camera case.

25. The camera holder according to claim 24, and further comprising a surrounding flange formed around said adaptor for shielding said ball-shaped camera case from a direct sunlight and covering said ball-shaped camera from rain and snow.

26. The camera holder according to claim 1, wherein said ball-shaped camera case comprises two bisected segments including a front segment and a rear segment, and wherein said front segment comprises one of a transparent pane and a semi-transparent pane.

27. The camera holder according to claim 26, wherein said pane is mounted onto said front segment using fasteners that are accessible from an outer surface of said ball-shaped camera case.

28. The camera housing system according to claim 27, wherein said fasteners are screws.

29. The camera housing system according to claim 26, wherein said pane is mounted onto said front segment using fasteners that are only accessible from within an inner cavity of said ball-shaped camera case.

30. The camera holder according to claim 29, wherein said fasteners are screws.

31. The camera holder according to claim 26, wherein said front segment is wholly constructed of one of a transparent material and semi-transparent material.

32. The camera holder according to claim 1, wherein said ball-shaped camera case includes at least two segments and wherein portions of at least one of rear segments of said ball-shaped camera case are truncated.

33. The camera holder according to claim 1, wherein said ball-shaped camera case has an opening at a rear end thereof for enabling adjustment of a focus ring of a lens mounted inside said ball-shaped camera case and wherein one of a seal and a screw with a seal is used for sealing said opening.

34. The camera holder according to claim 1, wherein said ball-shaped camera case is airtight sealed and wherein said electrical cable inlet is provided with a seal.

35. The camera holder according to claim 1 wherein said structural body is one of a circular case, a rectangular case and a square case with a front cover for supporting and attaching said ring shaped holder to one of a wall, a ceiling and other planes and surfaces, and wherein said front cover has a shape of one of circular, rectangular and square and is of a matching size and shape to said one of said circular case, said rectangular case and said square case.

36. The camera holder according to claim 35, wherein said one of said circular case, said rectangular case and said square case comprises at least one of an electrical cable inlet and an inlet for a conduit electrical pipe.

37. The camera holder according to claim 36, wherein said one of said circular case, said rectangular case and said square case further comprises one of a power supply unit, an AC adaptor, a connector board and another electronic circuit and combinations thereof.

38. The camera holder according to claim 35, wherein said one of said circular case, said rectangular case and said square case further comprises one of a power supply unit, an AC adaptor, a connector board and another electronic circuit and combinations thereof.

39. The camera housing system according to claim 1, wherein said structural body is an electrical box embedded into one of a wall, a ceiling, a pole and other structure.

40. The camera housing system according to claim 1, wherein said structural body is an electrical box mounted to a surface of one of a wall, a ceiling and on a surface of other structure.

41. A camera holder comprising:

a ball-shaped camera case having a transparent front pane and a truncated rear end portion with an electrical cable inlet at said truncated rear end portion a holder ring having a flat surface at one end thereof and one of a sharp edged inner—rim and a curved inner-rim having a curvature radius equal to a radius of said ball-shaped camera case at another end thereof and an opening for providing a passage for said electrical cable to one of a conduit and a cable cavity of a wall or a ceiling, and other structural body having a flat surface;

an elongated cylindrical cover having a flanged rim at one end thereof and a portion of a hemispherical shape with a curvature radius equal to a radius of said ball-shaped camera and further including one of a cutout of a random shape that is larger than said front pane and an elongated cutout having a width commensurating with the angle of view of a lens of said ball-shaped camera case extending from a center of said portion of hemispherical shape toward said flanged rim for providing an optical path for said lens and for gripping said ball-shaped camera case inside said portion of hemispherical shape of said elongated cylindrical cover and for providing said ball-shaped camera case with positioning capacity for said lens extending throughout said cutout;

wherein said flanged rim has elongated mounting holes for fasteners for attaching said elongated cylindrical cover to said wall or ceiling or other structural body with the flat surface and for locking said ball-shaped camera case between said holder ring and said portion of hemispheric shape, wherein said elongated cylindrical cover can be rotatably adjusted about a center axis thereof throughout the length of said elongated mounting holes and said lens can be adjusted to any position within the length and shape of said cutout and wherein said electrical cable passing through said holder ring is not obstructed.

42. The camera holder according to claim 41, and further comprising a layer of a seal covering all internal surface of said cylindrical cover including a surface of said flanged rim for sealing gaps and cavities between said cylindrical cover and said ball-shaped camera case and between said flanged rim and said flat surface of said holder ring for providing a watertight sealed camera holder.

43. A camera holder comprising:

a ball-shaped camera case having a transparent front pane and a truncated rear end portion having an electrical cable inlet at said truncated rear end portion;

a holder ring having a passage for said electrical cable to one of a conduit and to a cable cavity of one of a wall, a ceiling, a column, of a pole and other structural body, and an inner rim having one of a sharp edge and an inner-rim with a curved edge having a curvature radius equal to a radius of said ball-shaped camera case at one surface thereof, and another surface thereof being shaped to match a surface of said one of said ceiling, said column, said pole and said other structural body;

an elongated cylindrical cover including a front portion and a rear portion connected via a rotating joint wherein said rear portion includes a flanged rim and said front portion has a hemispherical shape with a curvature radius equal to a radius of said ball-shaped camera case and further including one of a cutout of a random shape that is larger than said front pane and an elongated cutout having a width commensurating with the angle of view of a lens of said ball-shaped camera case extending from a center of said hemispherical shape toward said flanged rim for providing an optical path for said lens and for gripping said ball-shaped camera inside said front portion of hemispherical shape of said elongated cylindrical cover and for providing said ball-shaped camera case with positioning capacity for said lens extending throughout said cutout;

said rotating joint having a surrounding slot on one end thereof and a surrounding hook on another end thereof for providing said front portion with rotation capacity about a center axis thereof, wherein said another surface is shaped to match the surface of one of said wall, said ceiling, said column, said pole and said other structural body and has holes for said fasteners for attaching said elongated cylindrical cover to one of said wall, said ceiling, said column, said pole and said other structural body for locking said ball-shaped camera between said holder ring and said front portion of hemispheric shape and wherein said front portion can be rotatably adjusted about a central axis thereof and said lens can be adjusted to any position within the length and shape of said cutout and wherein said electrical cable passing through said holder ring is not obstructed.

44. The camera holder according to claim 43, wherein said holder ring further comprises first mounting holes for mounting said holder ring on structural surfaces using fasteners and second mounting holes complementary to said mounting holes of said flanged rim for mounting said flanged rim onto said holder ring using fasteners.

* * * * *